United States Patent
Ramamurthy et al.

(10) Patent No.: US 9,924,434 B1
(45) Date of Patent: Mar. 20, 2018

(54) METHOD AND SYSTEM FOR DIVERTING WCDS BASED ON UNAVAILABILITY OF AUTHENTICATION PROCEDURE

(71) Applicant: Sprint Spectrum L.P., Overland Park, KS (US)

(72) Inventors: Suryan Ramamurthy, Olathe, KS (US); Saravana Velusamy, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 996 days.

(21) Appl. No.: 14/074,500

(22) Filed: Nov. 7, 2013

(51) Int. Cl.
*H04W 36/24* (2009.01)

(52) U.S. Cl.
CPC .................................. *H04W 36/24* (2013.01)

(58) Field of Classification Search
None
See application file for complete search history.

(56) References Cited

U.S. PATENT DOCUMENTS

| | | | |
|---|---|---|---|
| 2008/0254768 A1 | 10/2008 | Faccin | |
| 2011/0261787 A1* | 10/2011 | Bachmann | H04L 63/029 370/331 |
| 2012/0020345 A1 | 1/2012 | Zhou et al. | |
| 2012/0063300 A1 | 3/2012 | Sahin et al. | |
| 2013/0242754 A1* | 9/2013 | Shaikh | H04W 24/04 370/242 |
| 2014/0016614 A1* | 1/2014 | Velev | H04W 4/005 370/331 |
| 2014/0334371 A1* | 11/2014 | Kim | H04W 52/0206 370/311 |

OTHER PUBLICATIONS

Alcatel-Lucent, "The LTE Network Architecture: A comprehensive tutorial," Strategic White Paper, 2009.
EventHelix.com Inc., "LTE Attach and Default Bearer Setup Messaging," 2012.
European Telecommunications Standards Institute, "Universal Mobile Telecommunications System (UMTS); LTE; 3GPP Evolved Packet System (EPS); Optimized handover procedures and protocols between E-UTRAN access and cdma2000 HRPD Access; Stage 3," ETSI TS 129 276, version 11.0.0 (Oct. 2012).
Andreas Roessler, "Bridging the gap between LTE and 1xEV-DO, LTE-to-HRPD handover—A key element in LTE development," Rohde & Schwarz, Mar. 2010.

* cited by examiner

*Primary Examiner* — Huy D Vu
*Assistant Examiner* — Hong Shao

(57) ABSTRACT

A wireless communication device (WCD) transmits to a first serving system a data-connection request that requests a packet data connection. A mobility management entity (MME) determines that an authentication procedure for authenticating the WCD for the requested packet data connection is unavailable. In response, the MME initiates a handover of the WCD from the first serving system to a second serving system. The first and second serving systems use different air interface protocols. When the handover has been successfully completed, the MME stores an indication that the WCD has been diverted to the second serving system. The MME may subsequently determine that the authentication procedure has become available. In response, the MME determines whether the WCD is associated with a valid subscriber profile. If so, the MME requests the second serving system to invite the WCD to connect to the first serving system.

19 Claims, 4 Drawing Sheets

METHOD AND SYSTEM FOR DIVERTING WCDS BASED ON UNAVAILABILITY OF AUTHENTICATION PROCEDURE

BACKGROUND

Wireless networks may provide packet data services to wireless communication devices (WCDs). For example, a wireless network may include one or more packet gateways to one or more packet data networks. A WCD may request a packet data connection and, if the wireless network is able to authenticate the WCD for the request, the wireless network may connect the WCD to one of the packet data networks through one of the packet gateways.

The procedure for authenticating a WCD for a packet data connection may involve a number of different steps in which various network entities exchange various messages. However, if a network entity involved in the authentication procedure is unavailable, for example, because the network entity is off-line or is not functioning properly, then the authentication procedure may fail for one or more WCDs. In many cases, the unavailability is only temporary, perhaps lasting only seconds or minutes. Nonetheless, if a WCD requests a packet data connection at a time when the authentication procedure is temporarily unavailable, the request may be unsuccessful even though the WCD may in fact be authorized to establish the requested packet data connection.

OVERVIEW

In one aspect, example embodiments provide a method for a first serving system that is configured to wirelessly communicate with WCDs using a first air interface protocol and that includes a management entity. The first serving system receives a data-connection request transmitted by a WCD having a radio connection with the first serving system. The data-connection request requests a packet data connection. The management entity determines that an authentication procedure for authenticating the WCD for the requested packet data connection is unavailable. Based on the authentication procedure being unavailable, the management entity initiates a handover of the WCD from the first serving system to a second serving system, wherein the second serving system is configured to wirelessly communicate with WCDs using a second air interface protocol that is different than the first air interface protocol. The management entity determines that the handover of the WCD from the first serving system to the second serving system has been successfully completed. Responsive to determining that the handover of the WCD from the first serving system to the second serving system has been successfully completed, the management entity stores an indication that the WCD has been diverted to the second serving system.

In another aspect, example embodiments provide a method for a first serving system that is configured to wirelessly communicate with WCDs using a first air interface protocol and that includes a management entity and a home subscriber server (HSS). The first serving system receives a data-connection request transmitted by a WCD having a radio connection with the first serving system. The data-connection request requests a packet data connection. The management entity determines that the HSS is unavailable to authenticate the WCD for the requested packet data connection. Based on the HSS being unavailable, the management entity initiates a handover of the WCD from the first serving system to a second serving system, wherein the second serving system is configured to wirelessly communicate with WCDs using a second air interface protocol that is different than the first air interface protocol. The management entity determines that the handover of the WCD from the first serving system to the second serving system has been successfully completed. Responsive to determining that the handover of the WCD from the first serving system to the second serving system has been successfully completed, the management entity stores an indication that the WCD has been diverted to the second serving system.

In yet another aspect, example embodiments provide a management entity. The management entity comprises a network interface, a processor, data storage, and program instructions stored in the data storage. The program instructions are executable by the processor to perform functions, the functions comprising: (i) receiving, via the network interface, a data-connection request transmitted by a WCD having a radio connection with a first serving system, wherein the data-connection request requests a packet data connection; (ii) determining that an authentication procedure for authenticating the WCD for the requested packet data connection is unavailable; (iii) based on the authentication procedure being unavailable, initiating, via the network interface, a handover of the WCD from the first serving system to a second serving system; (iv) determining that the handover of the WCD from the first serving system to the second serving system has been successfully completed; and (v) responsive to determining that the handover of the WCD from the first serving system to the second serving system has been successfully completed, storing an indication that the WCD has been diverted to the second serving system.

DETAILED DESCRIPTION

1. Introduction

Figure 1:
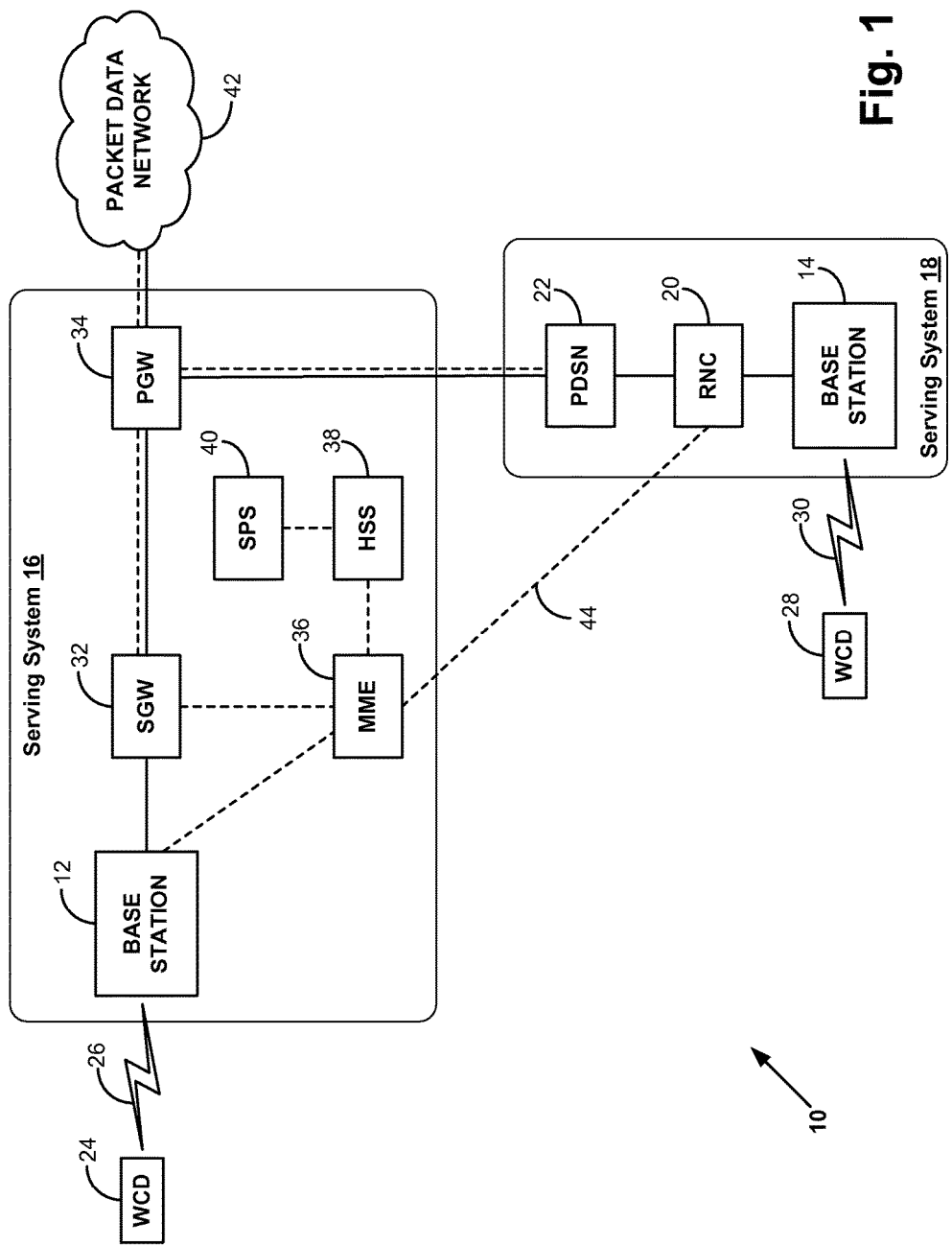
FIG. 1 is a block diagram of a wireless communication system, in accordance with an example embodiment.

Disclosed herein are methods and system that can divert WCDs from a first serving system to a second serving system when an authentication procedure in the first serving system is unavailable. The diverted WCDs may be able to use the resources of the second serving system (at least temporarily) to establish packet data connections and use the packet data connections for communication sessions. In some implementations, the diverted WCDs may be authenticated by the second serving system, for example, because the second serving system uses a different authentication procedure that is still available when the authentication procedure used by the first serving system is unavailable. In other implementations, the diverted WCDs may be allowed to use the resources of the second serving system temporarily without being authenticated. Once the authentication procedure used by the first serving system becomes available again, the diverted WCDs may come back to the first serving system.

In one example, a WCD establishes a radio connection with a base station of a first serving system and then transmits a data-connection request that requests a packet data connection. A management entity in the first serving system determines that an authentication procedure for authenticating the WCD for the requested packet data connection is unavailable, for example, because a home subscriber server (HSS) or other network entity involved in the authentication procedure is unavailable. Based on the authentication procedure being unavailable, the management entity initiates a handover of the WCD from the first serving system to the second serving system. When the handover has been successfully completed, the management entity stores an indication that the WCD has been diverted to the second serving system.

The management entity may also store indications of other WCDs that have been diverted to the second serving system. The management entity may store the indications in a table that the management entity uses to keep track of WCDs that that have been diverted to the second serving system due to unavailability of the authentication procedure. In some instances, the table may also identify WCDs that have been diverted to serving systems other than the second serving system due to unavailability of the authentication procedure.

When the authentication procedure becomes available, the management entity may use the stored indications of diverted WCDs to identify WCDs that can come back to the first serving system. In some implementations, the management entity may determine (e.g., by querying the HSS) which of the diverted WCDs are associated with valid subscriber profiles. For example, a diverted WCD that is not associated with a subscriber profile may be unauthorized to use the first serving system (and may also be unauthorized to use the second serving system). To get the diverted WCDs with valid subscriber profiles to come back to the first serving system, the management entity may identify the WCDs to the second serving system and request the second serving system to send to the identified WCDs communications that invite the WCDs to connect to the first serving system. The management entity may then allow a certain period of time for the diverted WCDs to transmit new data-connection requests to the first serving system. Any diverted WCD that does not transmit a new data-connection request within the allowed period may be deemed unauthorized. The management entity may identify any unauthorized WCDs to the second serving system, so that the second serving system can terminate any packet data connections that may have been established for unauthorized WCDs and/or otherwise prevent unauthorized WCDs from using resources of the second serving system. The management entity may also identify any unauthorized WCDs to a network security system.

In this way, a WCD can be allowed to temporarily use the resources of a second serving system when an authentication procedure used by a first serving system is unavailable.

2. Example Wireless Communication System

FIG. 1 illustrates an example wireless communication system 10 in which aspects of the present disclosure can be implemented. In FIG. 1, connections that carry bearer traffic are indicated by solid lines, connections that carry signaling traffic are indicated by dashed lines, and connections that carry both bearer traffic and signaling traffic are indicated by solid lines in combination with dashed lines. It is to be understood, that the arrangement of wireless communication system 10 shown in FIG. 1, and the processes described herein, are set forth herein for purposes of example only. Other arrangements and elements (e.g., machines, interfaces, functions, orders of elements, etc.) can be added or used instead, and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

In this example, wireless communication system 10 includes two different types of base stations, exemplified by base station 12 and base station 14. Base station 12 is part of a serving system 16 that includes an Evolved Packet Core (EPC). As described in more detail below, the EPC includes various elements that are configured to communicate with one another using the Internet Protocol (IP). Thus, serving system 16 could be an all-IP network. Base station 14 is part of a serving system 18 that is controlled by a radio network controller (RNC) 20. In some examples, serving system 18 is not an all-IP network but may, nonetheless, support IP-based communications. For example, RNC 20 may serve as a packet control function (PCF), and serving system 18 may include a packet data serving node (PDSN) 22.

Base stations 12 and 14 each provide a respective wireless coverage area within which the base station can communicate with one or more WCDs. The wireless coverage areas provided by base stations 12 and 14 could be either overlapping or non-overlapping. As shown, base station 12 is in wireless communication with WCD 24 via an air interface 26, and base station 14 is in wireless communication with WCD 28 via an air interface 30. WCDs 24 and 28 could be wireless telephones, wirelessly-equipped handheld, tablet, or laptop computers, or any other device that supports wireless communication.

Base stations 12 and 14 communicate with WCDs using different air interface protocols. In one example, base station 12 communicates with WCDs, such as WCD 24, using a Long Term Evolution (LTE) protocol, whereas base station 14 communicates with WCDs, such as WCD 28, using a High Rate Packet Data (HRPD) protocol, such as EVDO. In that example, base station 12 may function as an eNodeB, and PDSN 22 may function as an HRPD serving gateway (HSGW). It is to be understood, however, that these air interface protocols are given merely as illustrative examples. In general, base stations 12 and 14 may communicate using any air interface protocol that is known currently or may be developed. Further, although serving systems 16 and 18 are shown in FIG. 1 with only one base station each, it is to be understood that serving system 16 and/or serving system 18 could include multiple base stations.

As shown in FIG. 1, the elements of the EPC in serving system 16 may include a serving gateway (SGW) 32, a packet gateway (PGW) 34, a mobility management entity (MME) 36, a home subscriber server (HSS) 38, and a subscriber profile store (SPS) 40. PGW 34 provides connectivity to a packet data network 42. SGW 32 supports IP bearer traffic between base station 12 and PGW 34. MME 36 manages signaling traffic between base station 12 and other elements of serving system 16, for example, relating to authentication of WCDs and activating and de-activating bearer connections for WCDs. HSS 38 is configured to authenticate WCDs, as well as access subscriber profiles stored in SPS 40. For example, SPS 40 may store subscriber profiles for WCDs that are authorized to use serving system 16.

With this configuration, serving system 16 can provide packet data connections to packet data network 42 for WCDs that have been authenticated for packet data connections. For example, a WCD (e.g., WCD 24) may establish a radio connection with a base station (e.g., base station 12) of serving system 16 and then use the radio connection to transmit a data-connection request. The data-connection request may request a packet data connection to a packet data network, which may be identified in the request by an access point name (APN). In response, MME 36 may initiate an authentication procedure to authenticate the WCD for the requested packet data connection. The authentication procedure could, for example, involve MME 36 communicating with HSS 38 and HSS 38 communicating with SPS 40. Other network entities could be involved in the authentication procedure, in addition to or instead of HSS 38 and SPS 40. Once the WCD has been authenticated, serving system 16 may provide a packet data connection to packet data network 42, for example, via SGW 32 and PGW 34. The packet data connection may be used by the WCD for Web access, email, text, voice-over-IP (VoIP), video, streaming media, gaming, and/or other packet data services.

Serving system 16 may also support interworking with serving system 18. The interworking could involve serving system 18 using resources in serving system 16 to connect to packet data network 42. For example, PDSN 22 may be able to connect to packet data network 42 through PGW 34. In this way, serving system 18 may be able to provide packet data connections to packet data network 42 through PGW 34. It is to be understood that connection through PGW 34 is only one illustrative example. In other examples, PDSN 22 may be able to connect to packet data network 42 in other ways, for example, without using resources of serving system 16.

The interworking between serving systems 16 and 18 could also involve handovers of WCDs from one serving system to the other. For example, in the case that base stations 12 and 14 have overlapping wireless coverage areas, serving system 16 may engage in signaling with serving system 18 to initiate a handover of a WCD 24 from base station 12 to base station 14. As well, serving system 18 may engage in signaling with serving system 16 to initiate a handover of WCD 28 from base station 14 to base station 12.

To facilitate such signaling, wireless communication system 10 may include a signaling interface 44 between serving systems 16 and 18. As shown, signaling interface 44 allows for communication between MME 36 in serving system 16 and RNC 20 in serving system 18. Alternatively or additionally, signaling interface 44 may allow for communication between MME 36 and other elements in serving system 18 (e.g., PDSN 22) and/or may allow for communication between RNC 20 (and/or other elements in serving system 18) and one or more elements in serving system 16 in addition to or instead of MME 36. The communications over signaling interface 44 could be related to handovers or other functions. In one example, signaling interface 44 could be an S101 interface, as described in European Telecommunications Standards Institute, "Optimized handover procedures and protocols between U-TRAN access and cdma2000 HRPD Access," ETSI TS 129 276, version 11.0.0 (October 2012), which is incorporated herein by reference.

As described in more detail below, serving system 16 may use signaling interface 44 to initiate handovers of WCDs (e.g., WCD 24) to serving system 18 in response to a failure condition in serving system 16 being detected. In one example, the failure condition could be unavailability of the authentication procedure used to authenticate WCDs for packet data connections. The unavailability of the authentication procedure could result from unavailability of HSS 38 or any other network entity involved in the authentication procedure. As a result of a failure condition, such as unavailability of HSS 38, serving system 16 may be unable to authenticate WCDs and, thus, may be unable to establish packet data connections requested by the WCDs. However, by initiating handovers of such WCDs to serving system 18, the WCDs may be able to establish packet data connections through serving system 18.

The WCDs diverted from serving system 16 to serving system 18 may be able to use the packet data connections established through serving system 18 only temporarily, i.e., only until the failure condition in serving system 16 is resolved. For example, when HSS 38 becomes available again, serving system 16 may communicate with serving system 18 over signaling interface 44 in order to have serving system 18 invite the diverted WCDs to connect to serving system 16 and to identify any of the diverted WCDs that are deemed unauthorized.

3. Example Methods

Figure 2:
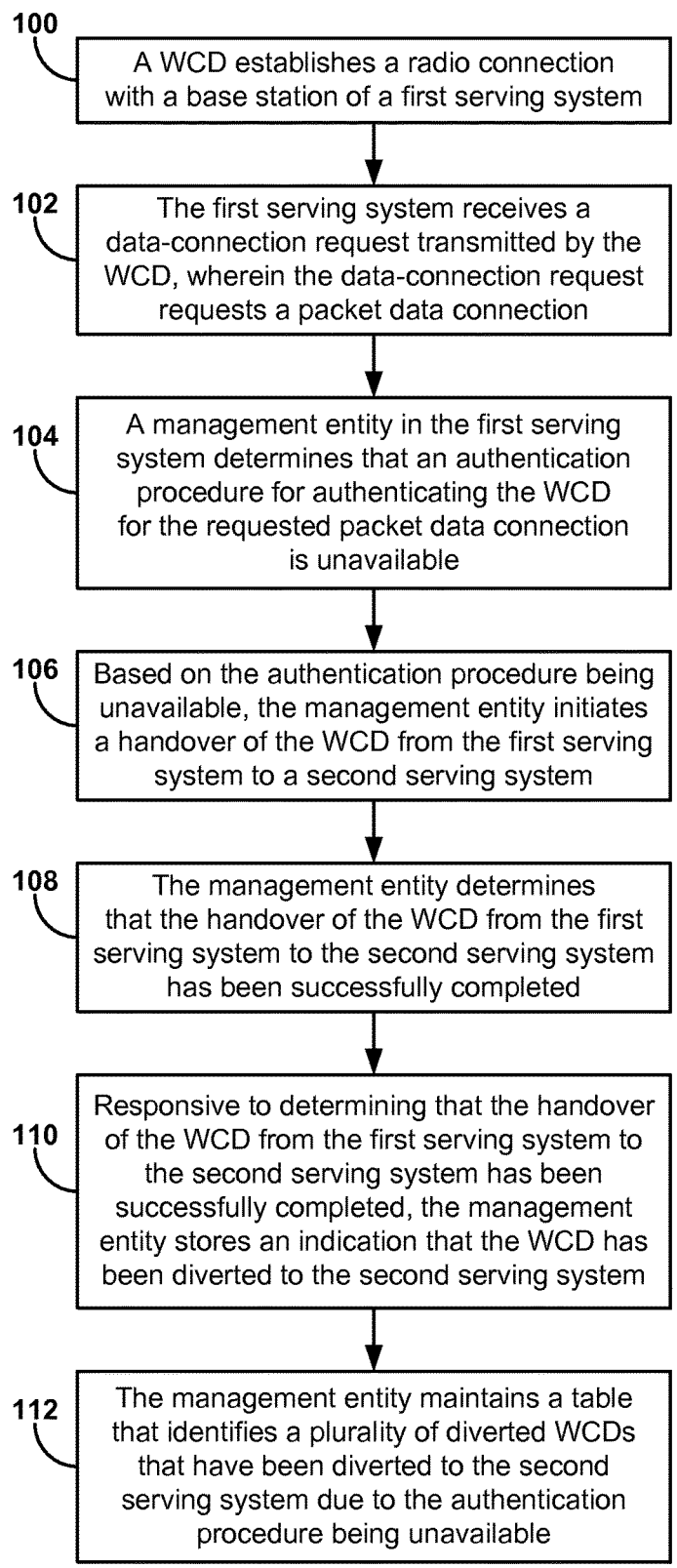
FIG. 2 is a flow chart illustrating a method, in accordance with an example embodiment.
Figure 3:
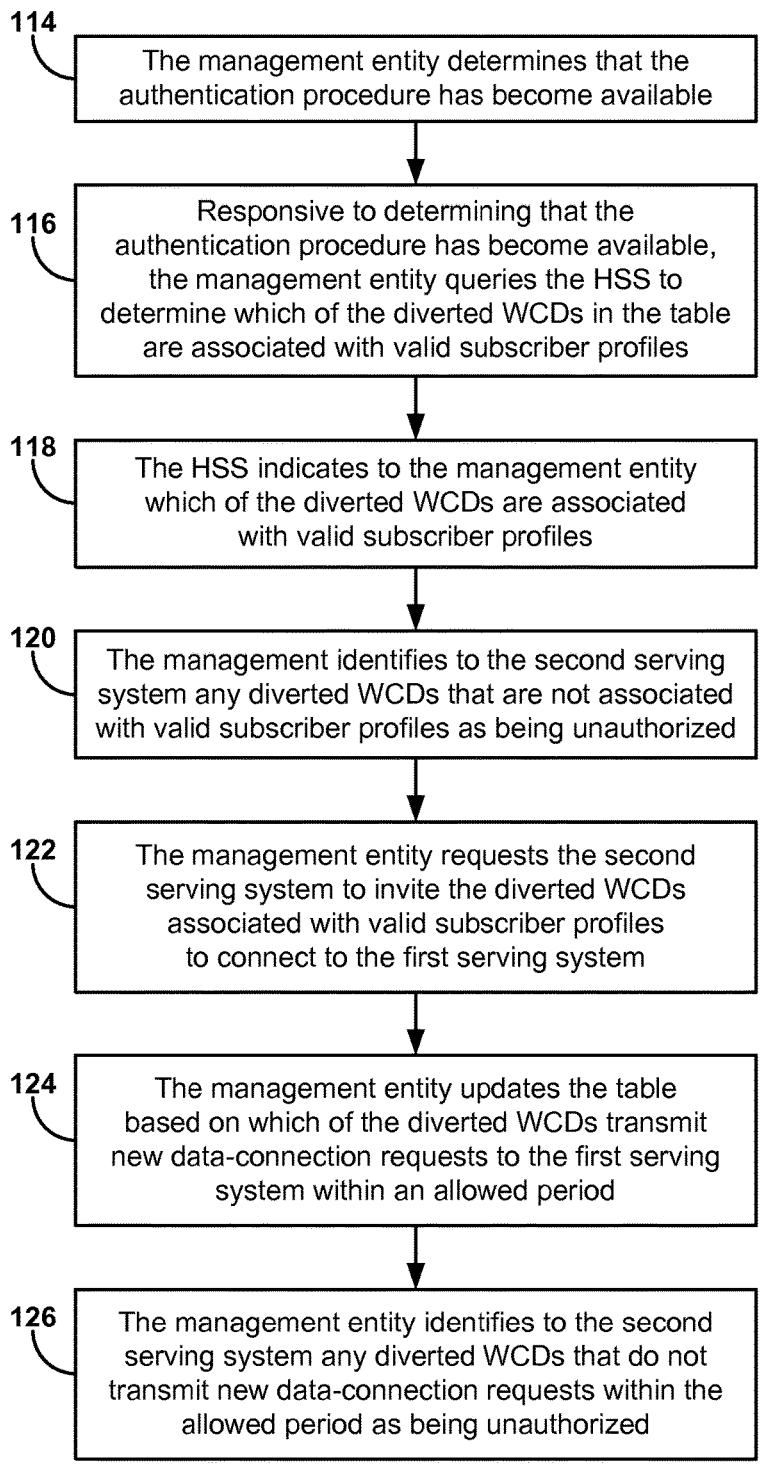
FIG. 3 is a flow chart illustrating a continuation of the method of FIG. 2, in accordance with an example embodiment.

FIGS. 2 and 3 are flow charts illustrating an example method. FIG. 2 illustrates an example in which a WCD (e.g., WCD 24) is diverted from a first serving system (e.g., serving system 16) to a second serving system (e.g., serving system 18) in response to an authentication procedure being unavailable. FIG. 3 illustrates how the method may proceed once the authentication procedure becomes available again. For purposes of illustration, the method of FIGS. 2 and 3 will be described in relation to wireless communication system 10 as shown in FIG. 1. It is to be understood, however, that the method could also be performed in wireless communication systems that are differently configured.

The method of FIG. 2 begins when a WCD (e.g., WCD 24) establishes a radio connection with a base station of a first serving system (e.g., base station 12 of serving system 16), as indicated by block 100. The WCD may establish this radio connection because the WCD has moved into the wireless coverage area of the base station, because the WCD has powered up within the wireless coverage area of the base station, because the WCD has become active after being dormant for a period of time, or for some other reason. To establish the radio connection, the WCD may transmit messages to and receive messages from the base station, for example, in accordance with a Radio Resource Control (RRC) protocol.

Once the WCD has established the radio connection with the first serving system, the WCD may transmit messages to a management entity (e.g., MME 36) in the first serving system and receive messages from the management entity, for example, in accordance with Non-Access Stratum (NAS) protocols. In some implementations, the WCD may initially transmit an attach request and a packet data network (PDN) connectivity request. The PDN connectivity request may include an APN that identifies a requested network for a packet data connection being requested by the WCD. The PDN connectivity request may also include a requested QoS level for the packet data connection. In other implementations, the WCD may identify the requested network and/or the requested QoS level in a subsequent message, such an ESM Information Response.

Thus, at some point, the first serving system receives a data-connection request transmitted by the WCD, wherein the data-connection request requests a packet data connection, as indicated by block 102. The management entity may receive the data-connection request (or information contained in the data-connection request) from the base station in response to the base station receiving the data-connection request from the WCD (e.g., a PDN connectivity request or ESM Information Response).

In the example of FIG. 2, however, the management entity determines that an authentication procedure for authenticating the WCD for the requested packet data connection is unavailable, as indicated by block 104. The authentication procedure may be unavailable because a network entity involved in the authentication procedure (e.g., HSS 38) is unavailable.

The management entity may determine that the authentication procedure is unavailable in various ways. In some implementations, the management entity may receive status information regarding the status of various network entities. For example, if the status information indicates that the HSS (or other network entity involved in the authentication procedure) is off-line or has failed, then the management entity may determine that the authentication procedure is unavailable.

In other implementations, the management entity may determine that the authentication procedure is unavailable when the HSS or other network entity fails to respond to one or more queries from the management entity. For example, in response to the data-connection request, the management entity may transmit a query to the HSS to initiate the authentication procedure. The management entity may then wait for up to a predetermined period of time (e.g., 1-5 seconds) after transmitting the query to receive a response from the HSS. If the management entity does not receive a response within that predetermined period of time, the management entity may re-transmit the query to the HSS and again wait to receive a response within the predetermined period of time. If, after a predetermined number of tries (e.g., three tries), the management entity does not receive a response to its query, the management entity may determine that the HSS is unreachable or non-responsive and, thus, determine that the authentication procedure is unavailable.

Other ways of determining that the authentication procedure is unavailable are possible as well. Further, it is to be understood that, in some cases, the management entity may determine that the authentication procedure is unavailable after receiving the data-connection request transmitted by the WCD. In other cases, the management entity may have already determined that the authentication procedure is unavailable before receiving the data-connection request transmitted by the WCD.

Based on the authentication procedure being unavailable, the management entity initiates a handover of the WCD from the first serving system to a second serving system (e.g., serving system 18), as indicated by block 106. The second serving system could be selected as the destination of the handover in various ways. In one example, the management entity has access to data indicative of which coverage areas of which other serving systems overlap the coverage areas of the first serving system. For example, the management entity may determine that the WCD has a radio connection with a base station (e.g., base station 12) that has a wireless coverage area that overlaps the wireless coverage area of a base station (e.g., base station 14) of the second serving system. On that basis, the management entity may select the second serving system as the destination for the handover of the WCD (and may also select a particular base station in the second serving system for the handover). Alternatively or additionally, the management entity may make use of information provided by the WCD. For example, while the WCD has a radio connection with a base station of the first serving system, the WCD may measure signal strengths of base stations in other serving systems and report the signal strengths to the first serving system. The management entity may receive this signal strength information and thereby identify a base station in the second serving system that has a sufficiently high signal strength to support a handover of the WCD. Other ways of selecting the second serving system for the handover of the WCD are possible as well.

To initiate the handover, the management entity may communicate with the second serving system (e.g., over signaling interface 44) and with the WCD. For example, the management entity may transmit to the second serving system a handover request that identifies the WCD. The handover request may also identify a specific base station of the second serving system (e.g., base station 14) for the handover. In response to the handover request, the management entity may receive from the second serving system a response indicating that the second serving system accepts the requested handover of the WCD. The response may also specify air interface resources of the second serving system that are available for the handover of the WCD. The specified air interface resources could include, for example, an uplink channel and downlink channel of base station 14. The uplink and downlink channels could be specified in terms of frequencies, codes, time slots, and/or in some other manner. Based on the acceptance from the second serving system, the management entity may transmit a handover instruction to the WCD. The handover instruction may identify the air interface resources specified in the response from the second serving system. The WCD may then use the air interface resources to establish a radio connection with the second serving system.

Once the management entity has initiated the handover, the management entity may determine whether the handover is successful. To make this determination, the management entity may query the second serving system regarding the status of the handover. Alternatively, the second serving system may notify the management entity regarding success or failure of the handover. In this example, the management entity determines that the handover of the WCD from the first serving system to the second serving system has been successfully completed, as indicated by block 108.

Responsive to determining that the handover of the WCD from the first serving system to the second serving system has been successfully completed, the management entity stores an indication that the WCD has been diverted to the second serving system, as indicated by block 110. The management entity may store this indication in a memory or other data storage within the management entity. Alternatively or additionally, the management entity may store this indication in an external database.

The management entity may also store indications of other WCDs that have been diverted, through successful handovers, from the first serving system to another serving system. For example, the management entity may maintain a table that identifies a plurality of WCDs that have diverted to the second serving system due to the authentication procedure being unavailable, as indicated by block 112. The table may identify each diverted WCD, for example, by the diverted WCD's network access identifier (NAI). For each diverted WCD, the table may also identify the serving system to which the WCD was diverted and the time that the diversion occurred (e.g., when the handover was successfully completed). The table could include other information as well.

FIG. 3 illustrates how the method of FIG. 2 may proceed when the authentication procedure again becomes available. Thus, at some point, the management entity determines that the authentication has become available, as indicated by block 114. The management entity may make this determination in various ways. In one example, the management entity may receive status information indicating that the HSS or other network entity that had been unavailable is now available. In another example, after determining that the HSS is unavailable, the management entity may continue receiving data-connection requests from WCDs and, in response, may continue sending queries to the HSS to authenticate the WCDs. At some point, the HSS may begin responding to the management entities queries, thereby indicating that the HSS is again available. Other ways of determining that the authentication procedure has become available are possible as well.

Responsive to determining that the authentication procedure has become available, the management entity queries the HSS to determine which of the diverted WCDs are associated with valid subscriber profiles, as indicated by block 116. The management entity may query the HSS in various ways. In one example, the management entity sends the HSS a batch query that identifies each of the diverted WCDs listed in the table. In another example, the management entity sends multiple queries to the HSS, e.g., an individual query for each diverted WCD listed in the table. Thus, the management entity may send one or more queries to the HSS, wherein the one or more queries collectively identify the diverted WCDs listed in the table.

In response to the one or more queries from the management entity, the HSS determines which of the identified WCDs are associated with valid subscriber profiles. The HSS may make this determination by using the identifiers of the WCDs to look up subscriber profile in either an internal database or an external database. For example, in the case that the first serving system is serving system 16 as shown in FIG. 1, SPS 40 may store subscriber profiles for WCDs that are authorized to use serving system 16, and HSS 38 may query SPS 40. The HSS may determine that a WCD is associated with a valid subscriber profile when (i) the HSS is able to find a subscriber profile from a look-up based on the WCD's identifier, and (ii) the subscriber profile indicates that the subscription is in good standing (e.g., not locked out, no overdue balance, etc.).

The HSS then indicates to the management entity which of the diverted WCDs are associated with valid subscriber profiles, as indicated by block 118. In one example, rather than sending the actual subscriber profiles to the management entity, the HSS sends a response that includes a flag for each diverted WCD. The flag for a given WCD may indicate whether the given WCD is or is not associated with a valid subscriber profile.

If there are any WCDs diverted to the second serving system that are not associated with valid subscriber profiles, the management entity may identify them to the second serving system as being unauthorized, as indicated by block 120. In response to this information, the second serving system may terminate any packet data connections that it may have established for the unauthorized WCDs and/or otherwise prevent the unauthorized WCDs from using the resources of the second serving system. The management entity may also take other actions, such as reporting unauthorized WCDs to a network security system.

Now that the authentication procedure is available, it may be possible for the first serving system to establish packet data connections for the WCDs that were diverted to the second serving system (provided that the WCDs can be authenticated). Moreover, it may be advantageous to have the diverted WCDs served by first serving system rather the second serving system (e.g., because of higher available data rates, better wireless coverage, etc.). To get the diverted WCDs to come back to the first serving system, the management entity may request the second serving system to invite the diverted WCDs associated with valid subscriber profiles to connect to the first serving system, as indicated by block 122. To make the request, the management entity may transmit to the second serving system one or more communication requests that identify the diverted WCDs and that request the second serving system to send to the WCDs communications (e.g., page messages) that invite the WCDs to connect to the first serving system.

In response to the request from the management entity, the second serving system may communicate with the WCDs as requested, for example, by transmitted one or more unicast or multicast messages. Each such message could be a handover request or handover instruction that requests or instructs a WCD to handover to the first serving system, an informational message that indicates that the first serving system is available, or any other type of communication that suggest that the WCD can, should, or must connect to the first serving system.

After making the request, the management entity determines which of the diverted WCDs come back to the first serving system (e.g., transmit new data-connection requests to the first serving system) within an allowed period of time. For example, the management entity may transmit to the second serving system a communication request that identifies a diverted WCD and requests that the second serving system invite the diverted WCD to connect to the first serving system. The management entity may then determine whether the diverted WCD has transmitted a new data-connection request to the first serving system within a preset period of time after transmission of the communication request. If the management entity determines that the diverted WCD has not transmitted a new data-connection request to the first serving system within the preset period of time, the management entity may transmit to the second serving system one or more additional communication requests (up to a maximum number), with each additional communication request being configured to request the second serving system to invite the diverted WCD to connect to the first serving system and being associated with a respective preset period of time for the diverted WCD to comply.

If a diverted WCD transmits a new data-connection request to the first serving system within the allowed period, then the WCD is no longer diverted and can be removed from the table. Thus, the management entity may update the table based on which of the diverted WCDs transmit new data-connection requests to the first serving system within the allowed period, as indicated by block 124. As discussed above, the allowed period could include one or more preset periods of time associated with one or more communication requests transmitted to the second serving system.

In some examples, diverted WCDs that do not transmit new data-connection requests to the first serving system within the allowed period may be regarded as "rogue" devices that should not be able to use the resources of either the first or second serving system. Thus, the management entity may identify to the second serving system any diverted WCDs that do not transmit new data-connection requests within the allowed period as being unauthorized, as indicated by block 126. In response to this information, the second serving system may terminate any packet data connections that it may have established for the unauthorized WCDs and/or otherwise prevent the unauthorized WCDs from using the resources of the second serving system. The management entity may also take other actions, such as reporting unauthorized WCDs to a network security system.

4. Example Network Entity

Figure 4:
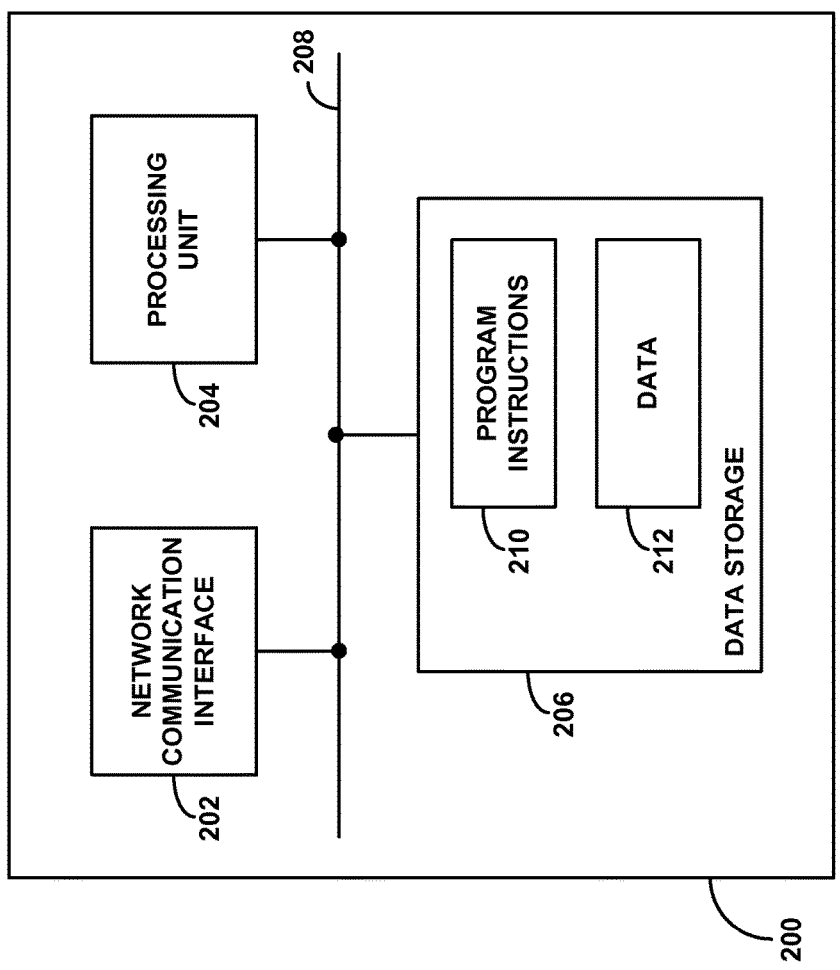
FIG. 4 is a block diagram of a network entity, in accordance with an example embodiment.

FIG. 4 is a block diagram of an example network entity 200. Network entity 200 could be management entity (e.g., MME 36) or some other type of network entity. As shown, the network entity 200 includes a network communication interface 202, a processing unit 204, and data storage 206, all of which may be communicatively linked together by a system bus, network, or other connection mechanism 208.

Network communication interface 202 supports communication with various other network entities, such as any of the network entities shown in FIG. 1. As such, the interface 202 may include one or more network interface modules, such as Ethernet network interface modules, or any other type of wired and/or wireless communication interfaces.

Processing unit 204 may comprise one or more general purpose processors (e.g., microprocessors) and/or one or more special purpose processors (e.g., application specific integrated circuits). Data storage 206 may comprise one or more volatile and/or non-volatile non-transitory storage components, such as optical, magnetic, or flash storage, and may be integrated in whole or in part with processing unit 204.

As shown, data storage 206 may hold program instructions 210 and data 212. Program instructions 210 may be executable by processing unit 204 to carry out various functions described herein. Data 212 could be any data that is generated, received, or used in connection with carrying out such functions.

In one example, program instructions 210 may be executable by processing unit 204 to carry out any of the functions described above with reference to FIGS. 2 and 3. Thus, the functions may include: (i) receiving, via the network interface 202, a data-connection request transmitted by a WCD having a radio connection with a first serving system, wherein the data-connection request requests a packet data connection; (ii) determining that an authentication procedure for authenticating the WCD for the requested packet data connection is unavailable; (iii) based on the authentication procedure being unavailable, initiating, via the network interface 202, a handover of the WCD from the first serving system to a second serving system; (iv) determining that the handover of the WCD from the first serving system to the second serving system has been successfully completed; and (v) responsive to determining that the handover off the WCD from the first serving system to the second serving system has been successfully completed, storing an indication that the WCD has been diverted to the second serving system.

5. Conclusion

Exemplary embodiments have been described above. Those skilled in the art will understand, however, that changes and modifications may be made to these embodiments without departing from the true scope and spirit of the invention.

What is claimed is:

1. A method, comprising:
receiving, by a first serving system, a data-connection request transmitted by a wireless communication device (WCD) having a radio connection with the first serving system, wherein the data-connection request requests a packet data connection, wherein the first serving system is configured to wirelessly communicate with WCDs using a first air interface protocol, and wherein the first serving system comprises a management entity;
determining, by the management entity, that an authentication procedure for authenticating the WCD for the requested packet data connection is unavailable, wherein determining, by the management entity, that the authentication procedure is unavailable comprises determining, by the management entity, that a network entity involved in the authentication procedure is unavailable;
based on the authentication procedure being unavailable, initiating, by the management entity, a handover of the WCD from the first serving system to a second serving system, wherein the second serving system is configured to wirelessly communicate with WCDs using a second air interface protocol that is different than the first air interface protocol;
determining, by the management entity, that the handover of the WCD from the first serving system to the second serving system has been successfully completed; and
responsive to determining that the handover of the WCD from the first serving system to the second serving system has been successfully completed, storing, by the management entity, an indication that the WCD has been diverted to the second serving system.

2. The method of claim 1, wherein initiating, by the management entity, a handover of the WCD from the first serving system to the second serving system, comprises:
transmitting, by the management entity, a handover request to the second serving system;
receiving, by the management entity, a response to the handover request, wherein the response specifies air interface resources of the second serving system available to the WCD for the handover; and
transmitting, by the management entity, a handover instruction to the WCD, wherein the handover instruction identifies the air interface resources of the second serving system available to the WCD for the handover.

3. The method of claim 1, further comprising:
after the handover of the WCD from the first serving system to the second serving system has been successfully completed, determining, by the management entity, that the authentication procedure has become available.

4. The method of claim 3, further comprising:
responsive to determining that the authentication procedure has become available, determining, by the management entity, whether the WCD is associated with a valid subscriber profile.

5. The method of claim 4, further comprising:
determining, by the management entity, that the WCD is associated with a valid subscriber profile; and
responsive to determining that the WCD is associated with a valid subscriber profile, transmitting, by the management entity, a communication request to the second serving system, wherein the communication request identifies the WCD and requests that the second serving system invite the WCD to connect to the first serving system.

6. The method of claim 5, further comprising:
determining, by the management entity, whether the WCD has transmitted a data-connection request to the first serving system within a preset period of time after transmission of the communication request.

7. The method of claim 6, further comprising:
making a determination, by the management entity, that the WCD has not transmitted a data-connection request to the first serving system within a preset period of time after transmission of the communication request; and
based on the determination that the WCD has not transmitted a data-connection request to the first serving system within the preset period of time after transmission of the communication request, sending, by the management entity, one or more additional communication requests to the second serving system, wherein the one or more additional communication requests each request that the second serving system invite the WCD to connect to the first serving system.

8. The method of claim 7, further comprising:
making a determination, by the management entity, that the WCD has not transmitted a data-connection request to the first serving system after transmission of the one or more communication requests; and
based on the determination that the WCD has not transmitted a data-connection request to the first serving system after transmission of the one or more communication requests, indicating, by the management entity, to the second serving system that the WCD is unauthorized.

9. The method of claim 1, wherein the network entity is a home subscriber server (HSS).

10. The method of claim 1, wherein storing, by the management entity, an indication that the WCD has been diverted to the second serving system comprises:
storing, by the management entity, an identification of the WCD in a table, wherein the table identifies a plurality of diverted WCDs that have been diverted to the second serving system due to the authentication procedure being unavailable.

11. A method, comprising:
receiving, by a first serving system, a data-connection request transmitted by a wireless communication device (WCD) having a radio connection with the first serving system, wherein the data-connection request requests a packet data connection, wherein the first serving system is configured to wirelessly communicate with WCDs using a first air interface protocol, and wherein the first serving system comprises a management entity and a home subscriber server (HSS);
determining, by the management entity, that the HSS is unavailable to authenticate the WCD for the requested packet data connection;
based on the HSS being unavailable, initiating, by the management entity, a handover of the WCD from the first serving system to a second serving system, wherein the second serving system is configured to wirelessly communicate with WCDs using a second air interface protocol that is different than the first air interface protocol;
determining, by the management entity, that the handover of the WCD from the first serving system to the second serving system has been successfully completed; and
responsive to determining that the handover of the WCD from the first serving system to the second serving system has been successfully completed, storing, by the management entity, an indication that the WCD has been diverted to the second serving system.

12. The method of claim 11, wherein storing, by the management entity, an indication that the WCD has been diverted to the second serving system, comprises:
storing, by the management entity, an identification of the WCD in a table, wherein the table identifies a plurality of diverted WCDs that have been diverted to the second serving system due to the HSS being unavailable.

13. The method of claim 12, further comprising:
determining, by the management entity, that the HSS has become available;
responsive to determining that the HSS has become available, sending, by the management entity, one or more queries to the HSS, wherein the one or more queries identify each of the diverted WCDs in the table; and
receiving, by the management entity, one or more responses from the HSS to the one or more queries, wherein the one or more responses indicate which of the diverted WCDs are associated with valid subscriber profiles.

14. The method of claim 13, further comprising:
transmitting, by the management entity, one or more communication requests to the second serving system, wherein the one or more communication requests identify the diverted WCDs associated with valid subscriber profiles and request that the second serving system invite the identified WCDs to connect to the first serving system.

15. A network entity, comprising:
a network interface;
a processor;
data storage; and
program instructions stored in the data storage and executable by the processor to perform functions, the functions comprising:
receiving, via the network interface, a data-connection request transmitted by a wireless communication device (WCD) having a radio connection with a first serving system, wherein the data-connection request requests a packet data connection;
determining that an authentication procedure for authenticating the WCD for the requested packet data connection is unavailable, wherein determining that the authentication procedure is unavailable comprises determining that a home subscriber server (HSS) is unavailable;
based on the authentication procedure being unavailable, initiating, via the network interface, a handover of the WCD from the first serving system to a second serving system;
determining that the handover of the WCD from the first serving system to the second serving system has been successfully completed; and
responsive to determining that the handover of the WCD from the first serving system to the second serving system has been successfully completed, storing an indication that the WCD has been diverted to the second serving system.

16. The network entity of claim 15, wherein the functions further comprise:
after the handover of the WCD from the first serving system to the second serving system has been successfully completed, determining, that the authentication procedure has become available.

17. The network entity of claim 16, wherein the functions further comprise:
responsive to determining that the authentication procedure has become available, determining whether the WCD is associated with a valid subscriber profile.

18. The network entity of claim 17, wherein determining whether the WCD is associated with a valid subscriber profile, comprises:
sending, via the network interface, a query to the HSS, wherein the query identifies the WCD; and
receiving, via the network interface, a response to the query from the HSS, wherein the response indicates whether the WCD is associated with a valid subscriber profile.

19. The network entity of claim 18, wherein the functions further comprise:
responsive to a determination that the WCD is associated with a valid subscriber profile, transmitting, via the network interface, a communication request to the second serving system, wherein the communication request identifies the WCD and requests that the second serving system invite the WCD to connect to the first serving system.

* * * * *